United States Patent
Shi et al.

(10) Patent No.: US 12,004,242 B2
(45) Date of Patent: *Jun. 4, 2024

(54) SYSTEM INFORMATION INDICATION METHOD AND APPARATUS AND COMMUNICATION SYSTEM

(71) Applicant: FUJITSU LIMITED, Kawasaki (JP)

(72) Inventors: Yulong Shi, Beijing (CN); Meiyi Jia, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,387

(22) Filed: Nov. 14, 2022

(65) Prior Publication Data

US 2023/0080717 A1    Mar. 16, 2023

Related U.S. Application Data

(63) Continuation of application No. 16/571,856, filed on Sep. 16, 2019, now Pat. No. 11,582,813, which is a
(Continued)

(51) Int. Cl.
*H04W 4/00*    (2018.01)
*H04L 1/1607*    (2023.01)
(Continued)

(52) U.S. Cl.
CPC ........... *H04W 76/11* (2018.02); *H04L 1/1614* (2013.01); *H04W 4/021* (2013.01); *H04W 28/06* (2013.01); *H04W 76/27* (2018.02); *H04W 80/08* (2013.01)

(58) Field of Classification Search
CPC ..... H04W 76/11; H04W 76/27; H04W 4/021; H04W 80/08; H04L 1/1614; H04L 12/1895
See application file for complete search history.

(56) References Cited

U.S. PATENT DOCUMENTS

| | | | |
|---|---|---|---|
| 9,706,588 B2 * | 7/2017 | Jiao | H04W 76/14 |
| 2006/0166693 A1 * | 7/2006 | Jeong | H04W 48/16 455/525 |

(Continued)

FOREIGN PATENT DOCUMENTS

| | | |
|---|---|---|
| CN | 101043671 A | 9/2007 |
| CN | 101217778 A | 7/2008 |

(Continued)

OTHER PUBLICATIONS

Decision of Reexamination issued by the China National Intellectual Property Administration for corresponding Chinese Patent Application No. 201780088180.5, dated Nov. 23, 2022, with an English translation.
(Continued)

*Primary Examiner* — Abdelnabi O Musa
(74) *Attorney, Agent, or Firm* — Myers Wolin, LLC (57) ABSTRACT

A system information indication method and apparatus and a communication system. In the embodiments of this disclosure, by indicating a correspondence between an area related ID or a system information related index and system information, and/or notifying information on a change of the area related ID or system information related index, a case may be avoided where a UE needs still to obtain system information from a network side when system information of a current cell is stored, thereby efficiently lowering power consumption of the UE in acquiring the system information.

9 Claims, 4 Drawing Sheets

Related U.S. Application Data continuation of application No. PCT/CN2017/078100, filed on Mar. 24, 2017.

(51) Int. Cl.
  *H04W 4/021* (2018.01)
  *H04W 28/06* (2009.01)
  *H04W 76/11* (2018.01)
  *H04W 76/27* (2018.01)
  *H04W 80/08* (2009.01)

(56) References Cited

U.S. PATENT DOCUMENTS

| | | | |
|---|---|---|---|
| 2011/0171924 A1 | 7/2011 | Faccin et al. | |
| 2011/0294508 A1 | 12/2011 | Min et al. | |
| 2012/0294694 A1 | 11/2012 | Garot | |
| 2014/0293901 A1* | 10/2014 | Hegde | H04W 48/16 370/329 |
| 2015/0257173 A1 | 9/2015 | You et al. | |
| 2016/0187458 A1* | 6/2016 | Shah | H04W 4/02 455/456.1 |
| 2017/0201871 A1* | 7/2017 | Ryu | H04W 4/06 |
| 2017/0215047 A1* | 7/2017 | Lee | H04L 12/1895 |
| 2017/0251500 A1* | 8/2017 | Agiwal | H04W 48/12 |
| 2017/0280372 A1* | 9/2017 | Martin | H04W 16/26 |
| 2017/0311290 A1* | 10/2017 | Adjakple | H04W 76/18 |
| 2017/0374491 A1 | 12/2017 | Xiao et al. | |
| 2018/0167918 A1* | 6/2018 | Ishii | H04W 72/23 |

FOREIGN PATENT DOCUMENTS

| | | |
|---|---|---|
| CN | 101583137 A | 11/2009 |
| CN | 101873669 A | 10/2010 |
| CN | 103179513 A | 6/2013 |
| CN | 104798400 A | 7/2015 |
| CN | 105792091 A | 7/2016 |
| WO | 2016122279 A1 | 8/2016 |

OTHER PUBLICATIONS

The International Search Report and Written Opinion of the International Searching Authority issued for corresponding International Patent Application No. PCT/CN2017/078100, dated Oct. 31, 2017, with English translation.

Notice of Reasons for Refusal issued by the Japan Patent Office for corresponding Japanese Patent Application No. 2019-551340, dated Aug. 11, 2020, with English translation attached.

Samsung, "Way forward on index based approaches", 3GPP TSG-RAN WG2 #97, Agenda item: 10.2.2.4, R2-1701569, Feb. 13-17, 2017, Athens, Greece.

Intel Corporation, "Index based system information provisioning", 3GPP TSG-RAN WG2 Meeting #97, Agenda item: 10.2.2.4, R2-1701738, Feb. 13-17, 2017, Athens, Greece.

Samsung, "System Information Signalling Design in NR", 3GPP TSG-RAN WG2 Meeting #95, Agenda item: 9.4.3.2, R2-164693, Aug. 22-26, 2016, Gothenburg, Sweden.

First Notification of Office Action and Search Report issued by the China National Intellectual Property Administration for corresponding Chinese Patent Application No. 201780088180.5, dated Feb. 3, 2021, with an English translation.

Intel Corporation, "System information for standalone NR deployment", Agenda Item: 9.2.2.2, 3GPP TSG-RAN WG2 Meeting #95bis, R2-166885, Kaohsiung, Taiwan, Oct. 10-14, 2016.

Second Notification of Office Action issued by the China National Intellectual Property Administration for corresponding Chinese Patent Application No. 201780088180.5, dated Nov. 22, 2021, with an English translation.

Decision of Rejection issued by the China National Intellectual Property Administration for corresponding Chinese Patent Application No. 201780088180.5, dated Mar. 3, 2022, with an English translation.

Notification of Reexamination issued by the China National Intellectual Property Administration for corresponding Chinese Patent Application No. 201780088180.5, dated Sep. 29, 2022, with an English translation.

Non-Final Office Action issued by the United States Patent and Trademark Office for corresponding U.S. Appl. No. 16/571,856, electronically dated Dec. 22, 2020.

Final Office Action issued by the United States Patent and Trademark Office for corresponding U.S. Appl. No. 16/571,856, electronically dated May 28, 2021.

Non-Final Office Action issued by the United States Patent and Trademark Office for corresponding U.S. Appl. No. 16/571,856, electronically dated Dec. 13, 2021.

Final Office Action issued by the United States Patent and Trademark Office for corresponding U.S. Appl. No. 16/571,856, electronically dated May 2, 2022.

Notice of Allowance issued by the United States Patent and Trademark Office for corresponding U.S. Appl. No. 16/571,856, electronically dated Aug. 25, 2022.

Notice of Reasons for Refusal issued by the Japan Patent Office for corresponding Japanese Patent Application No. 2022-038518, dated Feb. 21, 2023, with an English translation.

* cited by examiner

| 201 |
|---|
| the network equipment indicates a system information block (SIB) to which an area related ID or a system information related index corresponds to a UE |

FIG. 3

| 301 |
|---|
| the network equipment indicates to a UE that an area related ID or a system information related index is changed, and/or a changed area related ID or a changed system information related index |

FIG. 4

| 401 |
|---|
| the UE receives information on a changed area related ID or a changed system information related index indicated by a network equipment |

| 402 |
|---|
| when the changed area related ID or the changed system information related index and a system information block(s) to which the changed area related ID or the changed system information related index corresponds are stored, the UE applies the system information block(s), and does not re-acquire the system information block(s) from a network side |

1101 a header is added to a data packet, the header being located at a predetermined position in the data packet, such as a position other than the head, e.g. at the end, so as to deliver the data packet added with the header to a PDCP layer

FIG. 12

SYSTEM INFORMATION INDICATION METHOD AND APPARATUS AND COMMUNICATION SYSTEM

CROSS REFERENCE TO RELATED APPLICATIONS

This application is a continuation application of U.S. application Ser. No. 16/571,856 filed on Sep. 16, 2019, which is a continuation application of International Application PCT/CN2017/078100 filed on Mar. 24, 2017, the entire contents of each are incorporated herein by reference.

FIELD

This disclosure relates to the field of communications, and in particular to a system information indication method and apparatus and a communication system.

BACKGROUND

Issues related to next-generation wireless communication systems are under study in the 3rd Generation Partnership Project (3GPP). Among them, one of the research topics is lowering energies consumed by user equipment (UE) in acquiring system information of the network and further improving the efficiency of broadcasting and distribution of the system information.

In a long term evolution (LTE) system, system information is broadcast by a network side via a broadcast channel. After UE obtains system information of a current cell, if the UE leaves the cell and returns after a period of time, the UE needs to verify whether system information stored by it is still valid by checking whether a value tag broadcast in the cell is identical to a value of a value tag stored by it. Furthermore, if the UE leaves the current serving cell and enters a new cell, new system information must be obtained from the new cell.

Actually, neighboring cells often have some identical system information. After the UE enters the new cell, the re-obtained system information may possibly be identical to system information obtained by it in an original cell, in which case in order to lower energy consumed by the UE in acquiring the system information, an ID related to a region composed of multiple cells may be broadcast by the network side to indicate that some system information is universal in multiple cells. In this way, the UE may easily understand whether the system information of the new cell has been stored by itself, thereby avoiding energy consumed in acquiring the identical system information that has already been stored.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It has been agreed in the 3GPP that an index or an ID is broadcast in system information and used to indicate system information that are universal in multiple cells and notify UE of whether system information stored by it is still valid, thereby reducing the number of times of acquiring system information by the UE.

Currently, there exist two basic solutions for supporting broadcast of system information based on an index or an ID:

solution 1: UE first acquires all possible configuration lists of each system information block (SIB), each SIB corresponding to an index, the index indicating configuration used by a specific SIB of a current cell; the UE does not need to check a value of a value tag after switching to a new cell, and only needs to check whether configuration to which an index of an SIB of the current cell corresponds is stored; and the configuration is directly applies if the UE stores the configuration, and the SIB needs not to be acquired in the new cell; and solution 2: some SIBs universal in multiple cells correspond to an area ID, indicating that they are universal in a cell where the area ID is broadcast; the UE needs only to check if an area ID broadcast in a current cell is stored after switching to a new cell; and if the UE stores the area ID, it may directly apply an SIB to which the area ID corresponds, and does not need to acquire the SIB in the new cell.

In solution 2, one or more SIBs to which the broadcast area ID corresponds need to be definitely indicated in the system information broadcast in the cell, so as to notify the UE of which SIBs in the area to which the area ID corresponds are universal.

It was found by the inventors that in the above two solutions, if a content of the SIB corresponding to the index or the area ID in the current cell changes, according to a solution in an LTE system, a network side will notify UE via a paging message that system information changes, and at this moment of time, the UE needs to obtain updated system information from a broadcast channel. However, actually, the UE may have stored the updated index or area ID and the system information to which it corresponds, and needs not to acquire the system information again.

In order to solve the above problem, embodiments of this disclosure provide a system information indication method and apparatus and a communication system, so as to notify UE of an index or area ID to which updated system information corresponds, so that the UE may check whether the system information is stored, and energy consumed in acquiring the system information by the UE may be lowered.

According to a first aspect of the embodiments of this disclosure, there is provided a system information indication method, including: a network equipment indicates a system information block(s) to which an area related ID or a system information related index corresponds to a UE.

According to a second aspect of the embodiments of this disclosure, there is provided a system information indication method, including: an area related ID or a system information related index changes, and/or a changed area related ID or a changed system information related index is/are indicated by a network equipment to a UE.

According to a third aspect of the embodiments of this disclosure, there is provided a system information indication method, including: information on a changed area related ID or a changed system information related index indicated by network equipment is received by a UE; and when the changed area related ID or the changed system information related index and a system information block(s) to which the changed area related ID or the changed system information related index corresponds are stored, the system information block(s) is (are) applied by the UE, and the system information block(s) is (are) not to be re-acquired from a network side.

According to a fourth aspect of the embodiments of this disclosure, there is provided a system information indication apparatus, including: an indicating unit configured to indicate a system information block(s) to which an area related ID or a system information related index corresponds to a UE.

According to a fifth aspect of the embodiments of this disclosure, there is provided a system information indication apparatus, including: a first indicating unit configured to indicate to a UE that an area related ID or a system information related index changes, and/or a changed area related ID or a changed system information related index.

According to a sixth aspect of the embodiments of this disclosure, there is provided a system information indication apparatus, comprising: a first receiving unit configured to receive information on a changed area related ID or a changed system information related index indicated by a network equipment; and a processing unit configured to, when the changed area related ID or the changed system information related index and a system information block(s) to which the changed area related ID or the changed system information related index corresponds are stored, apply the system information block(s), and not to re-acquire the system information block(s) from a network side.

According to a seventh aspect of the embodiments of this disclosure, there is provided a network equipment, including the apparatus as described in the fourth or the fifth aspect.

According to an eighth aspect of the embodiments of this disclosure, there is provided a UE, including the apparatus as described in the sixth aspect.

According to a ninth aspect of the embodiments of this disclosure, there is provided a communication system, including the network equipment as described in the seventh aspect and the UE as described in the eighth aspect.

An advantage of the embodiments of this disclosure exists in that in the embodiments of this disclosure, by indicating a correspondence between an area related ID or a system information related index and system information, and/or notifying information on a change of the area related ID or system information related index, a case may be avoided where the UE needs still to obtain system information from a network side when system information of a current cell is stored, thereby efficiently lowering power consumption of the UE in acquiring the system information.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of the present disclosure, which constitute a part of the specification and illustrate the exemplary embodiments of the present disclosure, and are used for setting forth the principles of the present disclosure together with the description. The same element is represented with the same reference number throughout the drawings. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims. Various embodiments of this disclosure shall be described below with reference to the accompanying drawings. These embodiments are illustrative only, and are not intended to limit this disclosure.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network equipment", for example, refers to a device in a communication system that accesses a user equipment to the communication network and provides services for the user equipment. The network equipment may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communication network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Scenarios in the embodiments of this disclosure shall be described below by way of examples; however, the embodiments of this disclosure are not limited thereto.

Figure 1:
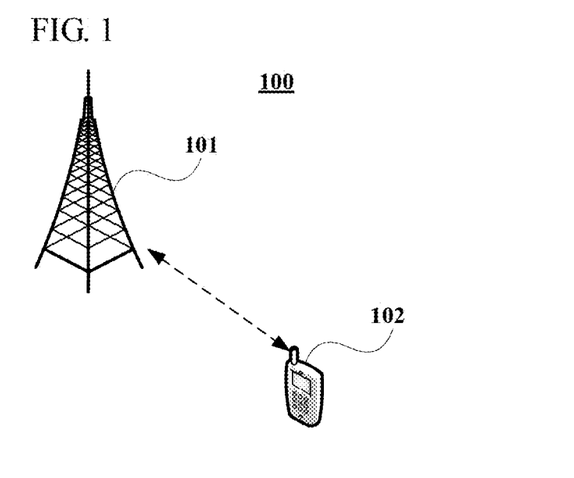
FIG. 1 is a schematic diagram of a communication system of an embodiment of this disclosure.

FIG. 1 is a schematic diagram of a communication system of an embodiment of this disclosure, in which a case where user equipment and network equipment are taken as examples is schematically shown. As shown in FIG. 1, the communication system 100 may include network equipment 101 and user equipment 102 (for the sake of simplicity, FIG. 1 shall be described by taking only one piece of user equipment as an example).

In the embodiment of this disclosure, existing traffics or traffics that may be implemented in the future may be performed between the network equipment 101 and the user equipment 102. For example, such traffics may include but not limited to an enhanced mobile broadband (eMBB), massive machine type communication (MTC), and ultra-reliable and low-latency communication (URLLC), etc.

The user equipment 102 may transmit data to the network equipment 101, for example, in a grant-free transmission manner. The network equipment 101 may receive data transmitted by one or more pieces of user equipment 102, and feed back information (such as acknowledgement (ACK)/non-acknowledgement (NACK) information) to the user equipment 102, and the user equipment 102 may acknowledge termination of a transmission process, or may perform new data transmission, or may perform data retransmission.

The embodiments of this disclosure shall be described below with reference to the accompanying drawings.

Embodiment 1

Figure 2:
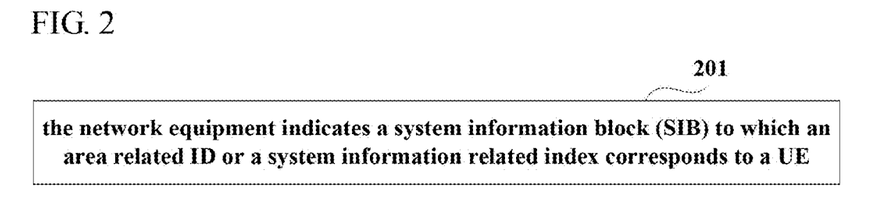
FIG. 2 is a schematic diagram of the system information indication method of Embodiment 1 of this disclosure.

The embodiment of this disclosure provides a system information indication method, which may be applicable to a network side, such as a network equipment. FIG. 2 is a schematic diagram of the method. As shown in FIG. 2, the method includes:

step 201: the network equipment indicates a system information block (SIB) to which an area related ID or a system information related index corresponds to a UE.

In this embodiment, if the UE stores the area related ID or the system information related index indicated by a current cell, the UE does not need to acquire system information to which the current cell corresponds again, but deems that the currently stored system information is valid, and the system information may be directly applied. Therefore, a case may possibly be avoided where the UE needs still to obtain system information from the network side when system information of the current cell is stored, thereby efficiently lowering power consumption of the UE in acquiring the system information.

In this embodiment, the area related ID or the system information related index refers in general to all IDs to which configuration used for indicating one or more pieces of system information broadcast by the current cell corresponds. For the convenience of description, they are collectively referred to as an area related ID or a system information related index; however, such a name is not limited in this embodiment.

In one implementation of this embodiment, the network equipment may indicate the system information block(s) to which an area related ID or a system information related index corresponds to the UE via an SIB-Mappinginfo field.

For example, the network equipment may configure an SIB-Mappinginfo field for each area related ID or system information related index in a broadcast message or a radio resource control (RRC) message transmitted by a network side, and indicate (enumerate) all system information blocks to which the area related ID or the system information related index corresponds via the SIB-Mappinginfo field.

In this implementation, the network equipment may add an AreaIDInfo field in the broadcast message or the RRC message transmitted by the network side, the AreaIDInfo field containing an area related ID or a system information related index, a value of a value tag to which an area related ID or a system information related index corresponds, and the said SIB-Mappinginfo, and multiple pieces of AreaID-Info constituting a list AreaIDList. For example, a format of the AreaIDList may be as shown below:

```
AreaIDList ::= SEQUENCE (SIZE (1..maxAreaID)) OF AreaIDInfo
AreaIDInfo ::=SEQUENCE {
    AreaID                      INTEGER (1..N)
    SystemInfoValueTagArea      INTEGER (1..M)
    SIB-MappingInfo             SIB-MappingInfo  }
```

In this implementation, the name of the AreaIDInfo field and the format of the AreaIDList are exemplary only, and this embodiment is not limited thereto. For example, the SystemInfoValueTagArea field is optional, and when such a field is contained, it may be used for indicating whether the system information is changed.

Therefore, the network equipment may notify the UE of a correspondence between the area related ID or the system information related index and the system information via the SIB-MappingInfo field.

In one implementation of this embodiment, the network equipment may indicate the system information block(s) to which the area related ID or the system information related index corresponds to the UE in a bitmap manner.

For example, the network equipment may configure a bitmap field for each area related ID or system information related index in a broadcast message or an RRC message transmitted by a network side, and indicates all system information blocks to which the area related ID or the system information related index corresponds via the bitmap field.

For example, assuming that a current system supports 20 SIBs, the network equipment may configure a bitmap field of 20 bits for an area related ID or a system information related index, each bit corresponding to one SIB, and when a bit is set to be "1", an SIB to which it corresponds is associated with (corresponds to) the area related ID or the system information related index; otherwise, the SIB is not associated with (does not correspond to) the area related ID or the system information related index.

Therefore, the network equipment may notify the UE of the correspondence between the area related ID or the system information related index and the system information via the bitmap field.

In one implementation of this embodiment, the network equipment may indicate the system information block(s) to which the area related ID or the system information related index corresponds to the UE via an index of a possible combination of system information blocks.

In this implementation, the network equipment may pre-define possible SIB combination manners. The possible SIB combination manners here are, for example, all SIB combination manners, or SIB combination manners determined according to a predetermined policy, or a certain number of SIB combination manners selected from all possible SIB combination manners according to a predetermined policy. The possible SIB combination manners may be pre-defined in a protocol; however, this embodiment is not limited thereto. Furthermore, for each possible SIB combination manner, the network equipment may allocate an index for it. Hence, the network equipment may indicate an index of an SIB combination to which the area related ID or the system information related index corresponds together with the area related ID or the system information related index in the broadcast message or the RRC message transmitted by the network side.

Therefore, the network equipment may also notify the UE of the correspondence between the area related ID or the system information related index and the system information.

In one implementation of this embodiment, the network equipment may indicate to the UE the system information block(s) to which the area related ID or the system information related index corresponds by indicating all SIBs in a system information window.

In this implementation, the network equipment may indicate a scheduled sequence number of a system information window where the system information block(s) to which the area related ID or the system information related index corresponds is located to the UE in a broadcast message or an RRC message transmitted by the network side.

In this implementation, system information blocks to which an area related ID or a system information related index corresponds may possibly be all scheduled in a same system information window, or may possibly be scheduled in multiple system information windows. In this implementation, by indicating all SIBs in a system information window, a correspondence between the area related ID or the system information related index and SIBs may be implicitly indicated to the UE.

In one implementation of this embodiment, the UE may request the network side for a system information block (s) to which an area related ID or a system information related index corresponds.

In this implementation, if the UE does not store an SIB(s) to which an area related ID or a system information related index corresponds, the UE may request the SIB(s) to which the area related ID or the system information related index corresponds via a system information request message, and carry the area related ID or the system information related index in the request message.

In this implementation, the network equipment may receive the system information request message transmitted by the UE, and indicate the system information block(s) to which the area related ID or the system information related index corresponds to the UE according to the system information request message. A particular indication method is as described above, which shall not be described herein any further.

With the method of this embodiment, the network equipment indicates the correspondence between the area related ID or the system information related index and the system information to the UE, and a case may be avoided where the UE needs still to obtain system information from a network side when system information of a current cell is stored, thereby efficiently lowering power consumption of the UE in acquiring the system information.

Embodiment 2

Figure 3:
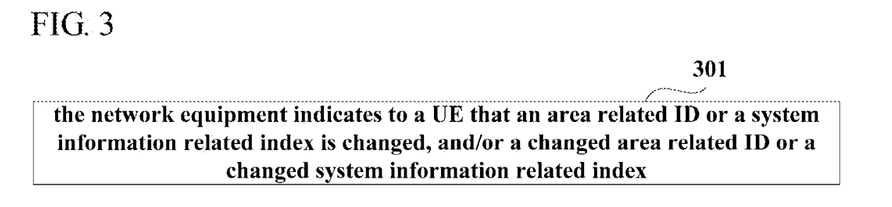
FIG. 3 is a schematic diagram of the system information indication method of Embodiment 2 of this disclosure.

The embodiment of this disclosure provides a system information indication method, which may be applicable to a network side, such as a network equipment. FIG. 3 is a schematic diagram of the method. As shown in FIG. 3, the method includes:

step 301: the network equipment indicates to a UE that an area related ID or a system information related index is changed, and/or a changed area related ID or a changed system information related index.

In this embodiment, if the UE finds according to the indication of the network equipment that it stores the changed area related ID or system information related index and its corresponding SIB, the UE may directly apply the SIB, and acquire system information associated with the area related ID or system information related index no longer, thereby lowering power consumption of the UE in acquiring the system information.

In this embodiment, an explanation of the area related ID or system information related index is identical to that in Embodiment 1, which shall not be described herein any further.

In this embodiment, the correspondence between the area related ID or system information related index and the SIB may be indicated via the method of Embodiment 1; however, this embodiment is not limited thereto.

In this embodiment, the network equipment may perform the above indication in a paging message, or may perform the above indication in an RRC message, or may perform the above indication in scheduling information of a paging message, such as performing the above indication in downlink control information (DCI) of a physical downlink control channel (PDCCH); however, this embodiment is not limited thereto.

In one implementation of this embodiment, the network equipment may indicate an area related ID or a system information related index before and after the area related ID or the system information related index being changed.

For example, the area related ID or the system information related index may be carried in pairs in a paging message or an RRC message, so as to respectively indicate the area related ID or the system information related index before and after the area related ID or the system information related index being changed.

For example, {Index #1: Index #2; Index #3: Index #5;} may be used to indicate that an area related ID or a system information related index is changed from #1 to #2, and from #3 to #5.

In another implementation of this embodiment, the network equipment may only indicate a changed (new/updated) area related ID or system information related index.

For example, only the changed area related ID or system information related index is carried in the paging message or the RRC message.

For example, {Index #2; Index #5;} may be used to indicate that an area related ID or a system information related index is changed into #2 and #5.

In this embodiment, as described above, the network equipment may further indicate system information block(s) to which the changed area related ID or system information related index corresponds to the UE. The system information block(s) here are new, that is, system information block(s) to which the changed area related ID or system information related index corresponds. Reference may be made to Embodiment 1 for a particular indication method, the contents of which being incorporated herein, which shall not be described herein further.

With the method of this embodiment, by notifying the information on the changed area related ID or system information related index by the network equipment to the UE, a case may be avoided where the UE needs still to obtain system information from a network side when system information of a current cell is stored, thereby efficiently lowering power consumption of the UE in acquiring the system information.

Embodiment 3

Figure 4:
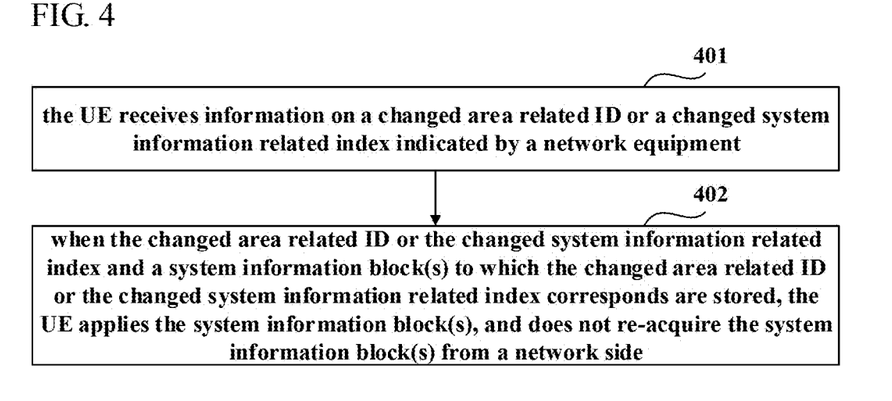
FIG. 4 is a schematic diagram of the system information indication method of Embodiment 3 of this disclosure.

The embodiment of this disclosure provides a system information indication method, which may be applicable to a user side, such as a user equipment, and is processing at the user side corresponding to the methods of embodiments 1 and 2, with contents identical to those in embodiments 1 and 2 being not going to be described herein any further. FIG. 4 is a schematic diagram of the method. As shown in FIG. 4, the method includes:

step 401: the UE receives information on a changed area related ID or a changed system information related index indicated by a network equipment; and step 402: when the changed area related ID or the changed system information related index and a system information block(s) to which the changed area related ID or the changed system information related index corresponds are stored, the UE applies the system information block(s), and does not re-acquire the system information block(s) from a network side.

In this embodiment, the network equipment notifies the UE of the changed area related ID or system information related index. Hence, in a case where the UE stores the changed area-related flag or system information related index and its corresponding system information block, the UE needs not to acquire the system information again, thereby lowering power consumption in acquiring system information.

In this embodiment, as described in Embodiment 2, the network equipment may notify the UE of the changed area related ID or system information related index via the paging message or the RRC message or the scheduling information of the paging message, and in step 401, the UE may obtain the changed area related ID or system information related index via the paging message or the RRC message or the scheduling information of the paging message.

In this embodiment, as described in Embodiment 2, the network equipment may only indicate the changed area related ID or system information related index, or may indicate the area related ID or the system information related index before and after the area related ID or the system information related index being changed, and the UE may perform the judgment in step 402 according to the indication of the network equipment, that is, according to the received information.

In this embodiment, when the UE does not store the system information block(s) to which the changed area related ID or system information related index corresponds, the UE may further transmit a system information request message to the network equipment, as described in Embodiment 2, so as to acquire from the network equipment the system information block(s) to which the changed area related ID or system information related index corresponds indicated by the network equipment.

In this embodiment, transmitting the system information request message to the network equipment by the UE is not limited to the case where the system information block(s) to which the changed area related ID or system information related index corresponds is/are not stored, that is, in other embodiments, the UE may transmit the above system information request message to the network equipment as demanded by itself, so as to obtain system information block(s) to which an area related ID or a system information related index corresponds.

In this embodiment, a manner in which the network equipment indicates the system information block(s) to which the area related ID or the system information related index corresponds is as described in Embodiment 1, which shall not be described herein any further.

With the method of this embodiment, by notifying the information on the change of the area related ID or system information related index by the network equipment to the UE, a case may be avoided where the UE needs still to obtain system information from a network side when system information of a current cell is stored, thereby efficiently lowering power consumption of the UE in acquiring the system information.

Embodiment 4

The embodiment of this disclosure provides a system information indication apparatus, which may be configured in a network equipment. As principles of the apparatus for solving problems are similar to that of the method of Embodiment 1, reference may be made to implementation of the method of Embodiment 1 for a particular implementation of this apparatus, with identical contents being not going to be described herein any further.

Figure 5:
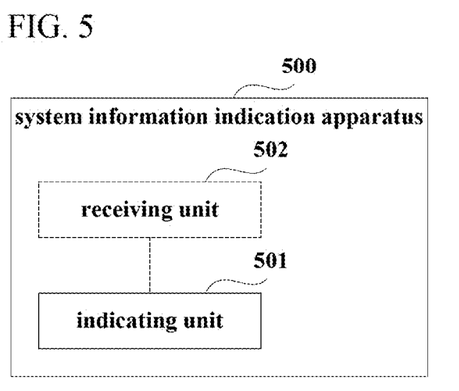
FIG. 5 is a schematic diagram of the system information indication apparatus of Embodiment 4 of this disclosure.

FIG. 5 is a schematic diagram of the apparatus of this embodiment. As shown in FIG. 5, the apparatus 500 includes:

an indicating unit 501 configured to indicate a system information block(s) to which an area related ID or a system information related index corresponds to a UE.

In one implementation of this embodiment, the indicating unit 501 may indicate the system information block(s) to which the area related ID or the system information related index corresponds to the UE via an SIB-Mappinginfo field.

In this implementation, the indicating unit 501 may configure an SIB-Mappinginfo field for each area related ID or system information related index in a broadcast message or a radio resource control (RRC) message transmitted by a network side, and indicates all system information blocks to which the area related ID or the system information related index corresponds via the SIB-Mappinginfo field.

In one implementation of this embodiment, the indicating unit 501 may indicate the system information block(s) to which the area related ID or the system information related index corresponds to the UE in a bitmap manner.

In this implementation, the indicating unit 501 may configure a bitmap field for each area related ID or system information related index in a broadcast message or an RRC message transmitted by a network side, and indicates all system information blocks to which the area related ID or the system information related index corresponds via the bitmap field.

In one implementation of this embodiment, the indicating unit 501 may indicate the system information block(s) to which the area related ID or the system information related index corresponds to the UE via an index of a possible combination of system information blocks.

In this implementation, the network equipment may define possible combinations of system information blocks and allocate an index for each possible combination of system information blocks, and the indicating unit 501 may indicate an index of a combination of system information blocks to which the area related ID or the system information related index corresponds together with the area related ID or the system information related index in the broadcast message or the RRC message transmitted by the network side.

In one implementation of this embodiment, the network equipment may indicate the system information block(s) to which the area related ID or the system information related index corresponds by indicating all SIBs in a system information window.

In this implementation, the indicating unit 501 may indicate a scheduled sequence number of a system information window where the system information block(s) to which the area related ID or the system information related index is located to the UE in a broadcast message or a RRC message transmitted by the network side.

In one implementation of this embodiment, the UE requests the network side for an SIB(s) to which an area related ID or a system information related index corresponds, and in this implementation, as shown in FIG. 5, the apparatus 500 may further include: a receiving unit 502 configured to receive a system information request message transmitted by the UE, the system information request message containing an area related ID or a system information related index. Hence, the indicating unit 501 may indicate the system information block(s) to which the area related ID or the system information related index corresponds to the UE according to the system information request message.

With the apparatus of this embodiment, the network equipment indicates the correspondence between the area related ID or the system information related index and the system information to the UE, and a case may be avoided where the UE needs still to obtain system information from a network side when system information of a current cell is stored, thereby efficiently lowering power consumption of the UE in acquiring the system information.

Embodiment 5

The embodiment of this disclosure provides a system information indication apparatus, which may be configured in a network equipment. As principles of the apparatus for solving problems are similar to that of the method of Embodiment 2, reference may be made to implementation of the method of Embodiment 2 for a particular implementation of this apparatus, with identical contents being not going to be described herein any further.

Figure 6:
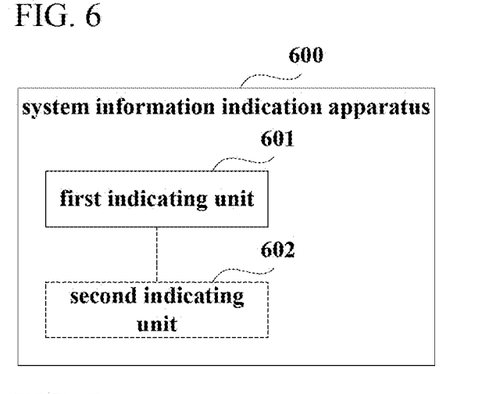
FIG. 6 is a schematic diagram of the system information indication apparatus of Embodiment 5 of this disclosure.

FIG. 6 is a schematic diagram of the apparatus of this embodiment. As shown in FIG. 6, the apparatus 600 includes:

a first indicating unit 601 configured to indicate to UE that an area related ID or a system information related index is changed, and/or a changed area related ID or a changed system information related index.

In this embodiment, the first indicating unit 601 may perform the above indication in a paging message or an RRC message or scheduling information of the paging message; however, this embodiment is not limited thereto.

In this embodiment, the first indicating unit may indicate the area related ID or the system information related index before being changed together with the changed area related ID or the changed system information related index, or may only indicate the changed area related ID or the changed system information related index.

In this embodiment, as shown in FIG. 6, the apparatus 600 may further include:
  a second indicating unit 602 configured to indicate a system information block(s) to which the area related ID or the system information related index corresponds to the UE.

In this embodiment, the second indicating unit 602 may be implemented by the apparatus in Embodiment 4, the contents of which being incorporated herein, which shall not be described herein any further.

With the apparatus of this embodiment, by notifying the information on the change of the area related ID or system information related index by the network equipment to the UE, a case may be avoided where the UE needs still to obtain system information from a network side when system information of a current cell is stored, thereby efficiently lowering power consumption of the UE in acquiring the system information.

Embodiment 6

The embodiment of this disclosure provides a system information indication apparatus, which may be configured in a UE. As principles of the apparatus for solving problems are similar to that of the method of Embodiment 3, reference may be made to implementation of the method of Embodiment 3 for a particular implementation of this apparatus, with identical contents being not going to be described herein any further.

Figure 7:
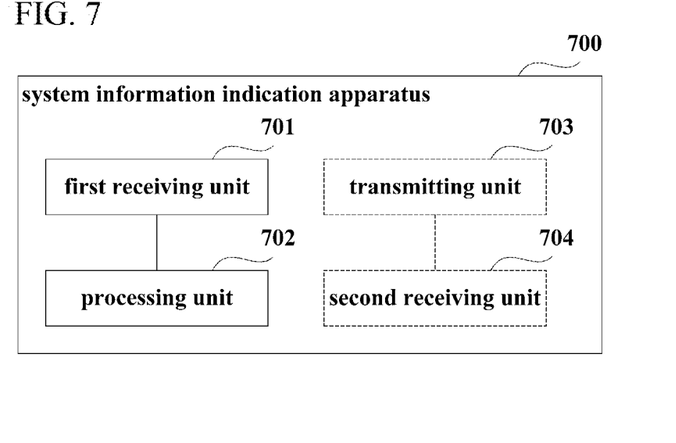
FIG. 7 is a schematic diagram of the system information indication apparatus of Embodiment 6 of this disclosure.

FIG. 7 is a schematic diagram of the apparatus of this embodiment. As shown in FIG. 7, the apparatus 700 includes: a first receiving unit 701 and a processing unit 702. The first receiving unit 701 is configured to receive information on a changed area related ID or a changed system information related index indicated by network equipment, and the processing unit 702 is configured to, when the changed area related ID or the changed system information related index and a system information block(s) to which the changed area related ID or the changed system information related index corresponds are stored, apply the system information block(s), and not to re-acquire the system information block(s) from a network side.

In this embodiment, the network equipment may indicate the changed area related ID or system information related index via a paging message or an RRC message or scheduling information of the paging message, and reference may be made to Embodiment 2 or 5 for a particular indication method, which shall not be described herein any further.

In this embodiment, the network equipment may indicate only the changed area related ID or system information related index, or may indicate the area related ID or system information related index before being changed and the changed area related ID or the changed system information related index at the same time, with particulars being as described in Embodiment 2 or 5, which shall not be described herein any further. And in this embodiment, the first receiving unit 701 may further receive the area related ID or the system information related index before being changed indicated by the network equipment.

In this embodiment, as shown in FIG. 7, the apparatus 700 may further include: a transmitting unit 703 and a second receiving unit 704. The transmitting unit 703 is configured to transmit a system information request message to the network equipment, the system information request message containing an area related ID or a system information related index, and the second receiving unit 704 is configured to receive a system information block(s) to which the area related ID or the system information related index corresponds indicated by the network equipment.

In this embodiment, the network equipment may indicate the system information block(s) to which the area related ID or the system information related index corresponds via a broadcast message or an RRC message transmitted by the network side, and reference may be made to Embodiment 1 or 4 for a particular indication method, which shall not be described herein any further.

With the apparatus of this embodiment, by notifying the information on the change of the area related ID or system information related index by the network equipment to the UE, a case may be avoided where the UE needs still to obtain system information from a network side when system information of a current cell is stored, thereby efficiently lowering power consumption of the UE in acquiring the system information.

Embodiment 7

The embodiment of this disclosure provides a network equipment, including the system information indication apparatus described in Embodiment 4 or 5.

Figure 8:
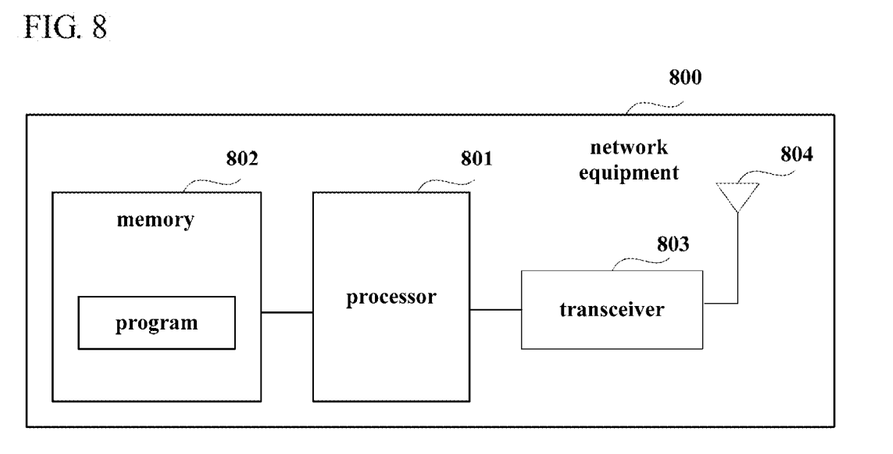
FIG. 8 is a schematic diagram of a structure of the network equipment of Embodiment 7 of this disclosure.

FIG. 8 is a schematic diagram of a structure of the network equipment of this embodiment. As shown in FIG. 8, the network equipment 800 may include a processor 801 and a memory 802, the memory 802 being coupled to the processor 801. The memory 802 may store various data, and furthermore, it may store a program for data processing, and execute the program under control of the processor 801, so as to receive various information transmitted by a UE, and transmit request information to the UE.

In one implementation, the functions of the system information indication apparatus described in Embodiment 4 or 5 may be integrated into the processor 801. For example, the processor 801 may be configured to: indicate a system information block(s) to which an area related ID or a system information related index corresponds to a UE. For another example, the processor 801 may also be configured to: indicate to a UE that an area related ID or a system information related index is changed, and/or a changed area related ID or a changed system information related index.

In another implementation, the system information indication apparatus described in Embodiment 4 or 5 and the processor 801 may be configured separately. For example, the system information indication apparatus described in Embodiment 4 or 5 may be configured as a chip connected to the processor 801, with its functions being realized under control of the processor 801.

Furthermore, as shown in FIG. 8, the network equipment 800 may include a transceiver 803, and an antenna 804, etc. Functions of the above components are similar to those in the related art, and shall not be described herein any further. It should be noted that the network equipment 800 does not necessarily include all the parts shown in FIG. 8, and furthermore, the network equipment 800 may include parts not shown in FIG. 8, and the related art may be referred to.

With the network equipment of this embodiment, the correspondence between the area related ID or the system information related index and the system information is indicated to the UE, and/or the information on the change of an area related ID or a system information related index is notified to the UE, a case may be avoided where the UE needs still to obtain system information from a network side when system information of a current cell is stored, thereby efficiently lowering power consumption of the UE in acquiring the system information.

Embodiment 8

The embodiment of this disclosure provides a UE, including the system information indication apparatus described in Embodiment 6.

Figure 9:
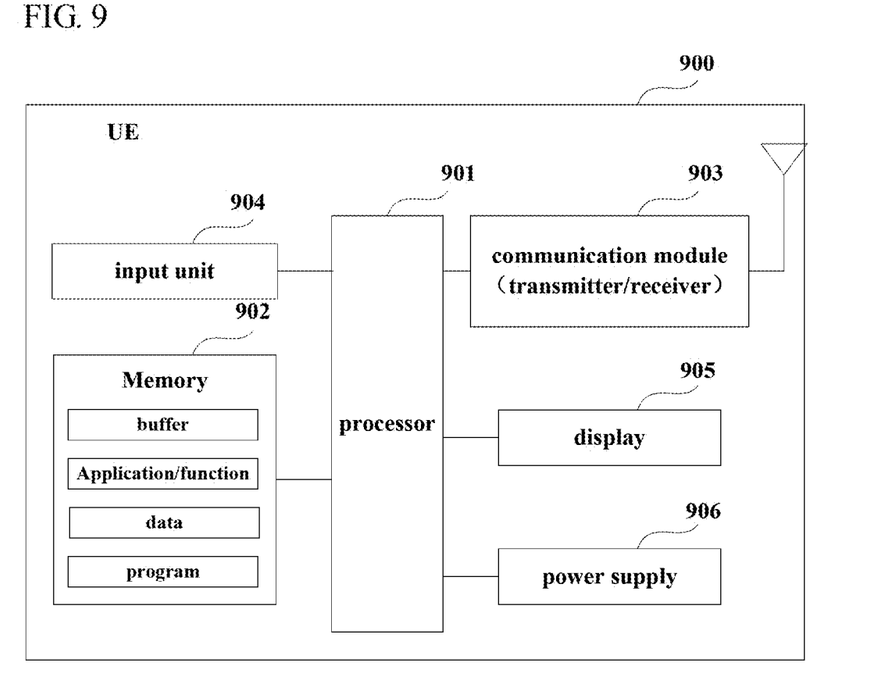
FIG. 9 is a schematic diagram of a structure of the UE of Embodiment 8 of this disclosure.

FIG. 9 is a schematic diagram of a structure of the UE 900 of this embodiment. As shown in FIG. 9, the UE 900 may include a processor 901 and a memory 902, the memory 902 being coupled to the processor 901. It should be noted that this figure is illustrative only, and other types of structures may also be used, so as to supplement or replace this structure and achieve a telecommunications function or other functions.

In one implementation, the functions of the system information indication apparatus may be integrated into the processor 901. For example, the processor 901 may be configured to: receive information on a changed area related ID or a changed system information related index indicated by network equipment, and when the changed area related ID or the changed system information related index and a system information block(s) to which the changed area related ID or the changed system information related index corresponds are stored, apply the system information block(s), and not to re-acquire the system information block(s) from a network side.

In another implementation, the system information indication apparatus and the processor 901 may be configured separately. For example, the system information indication apparatus may be configured as a chip connected to the processor 901, with its functions being realized under control of the processor 901.

As shown in FIG. 9, the UE 900 may further include a communication module 903, an input unit 904, a display 905, and a power supply 906. It should be noted that the UE 900 does not necessarily include all the parts shown in FIG. 9, and furthermore, the UE 900 may include parts not shown in FIG. 9, and the related art may be referred to.

As shown in FIG. 9, the processor 901 is sometimes referred to as a controller or control, which may include a microprocessor or other processor devices and/or logic devices, and the processor 901 receives input and controls operations of every component of the UE 900.

The memory 902 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the processor 901 may execute programs stored in the memory 902, so as to realize information storage or processing, etc. Functions of other parts are similar to those of the related art, which shall not be described herein any further. The parts of the UE 900 may be realized by specific hardware, firmware, software, or any combination thereof, without departing from the scope of this disclosure.

With the UE of this embodiment, the system information is determined according to the information indicated or notified by the network side, a case may be avoided where the UE needs still to obtain system information from a network side when system information of a current cell is stored, thereby efficiently lowering power consumption of the UE in acquiring the system information.

Embodiment 9

The embodiment of this disclosure provides a communication system, including the network equipment described in Embodiment 7 and the UE described in Embodiment 8.

As the network equipment and the UE have been respectively described in Embodiment 7 and Embodiment 8, the contents of which are incorporated herein, which shall not be described herein any further.

An embodiment of the present disclosure provides a computer readable program which, when executed in a system information indication apparatus or network equipment, will cause the system information indication apparatus or the network equipment to carry out the system information indication method as described in Embodiment 1 or 2.

An embodiment of the present disclosure provides a computer readable medium, including a computer readable program, which will cause a system information indication apparatus or network equipment to carry out the system information indication method as described in Embodiment 1 or 2.

An embodiment of the present disclosure provides a computer readable program, which, when executed in a system information indication apparatus or UE, will cause the system information indication apparatus or the UE to carry out the system information indication method as described in Embodiment 3.

An embodiment of the present disclosure provides a computer readable medium, including a computer readable program, which will cause a system information indication apparatus or UE to carry out the system information indication method as described in Embodiment 3.

Embodiment 10

Figure 10:
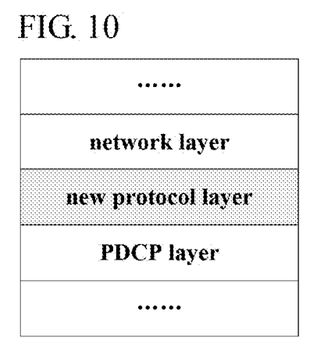
FIG. 10 is a schematic diagram of a position of a new protocol layer of Embodiment 10 of this disclosure.

Currently, it has been agreed in the 3GPP to add a new protocol layer on the packet data convergence protocol (PDCP) layer, such as a packet data association protocol (PDAP) layer, which is responsible for processing functions related to the quality of service (QoS) framework. FIG. 10 is a schematic diagram of a position of the new protocol layer.

It was found by the inventors that the new protocol layer needs to add a new packet header to a data packet from a higher layer network layer protocol, such as an Internet Protocol (IP) layer. In this embodiment, in order that a header compression function of its lower layer PDCP to network layer data is not affected, the packet header of the new protocol layer may be deposited at the end of the packet of the new protocol layer, that is, the packet header of the new QoS framework layer above PDCP layer shall be placed at the end of its packet.

Figure 11:
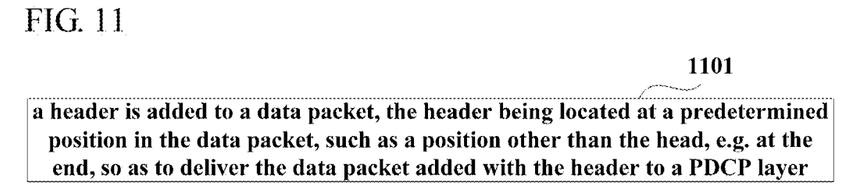
FIG. 11 is a schematic diagram of the data processing method of Embodiment 10 of this disclosure.

According to a first aspect of this embodiment, there is provided a data processing method. FIG. 11 is a schematic diagram of the method. Referring to FIG. 11, the method includes:
  step 1101: a header is added to a data packet, the header being located at a predetermined position in the data packet, such as a position other than a starting position, e.g. at the end, so as to deliver the data packet added with the header to a PDCP layer.

In this embodiment, a source of the data packet, a manner in which the header is added to the data packet, and a manner in which the data packet added with the header is delivered to the PDCP layer are not limited.

In this embodiment, the method is implemented in the above new protocol layer.

In this embodiment, as described above, the new protocol layer is responsible for processing functions related to the quality of service (QoS) framework, and is located on the PDCP layer.

In this embodiment, the data packet is, for example, an IP packet from an upper layer.

With this method, the packet header of the new protocol layer is placed at the end of its packet, such that a header compression function of its lower layer PDCP to the network layer data is not affected.

According to a second aspect of this embodiment, there is provided a data processing apparatus, an implementation principle of which being the same as that of the method of FIG. 11, with identical contents being not going to be described herein any further.

Figure 12:
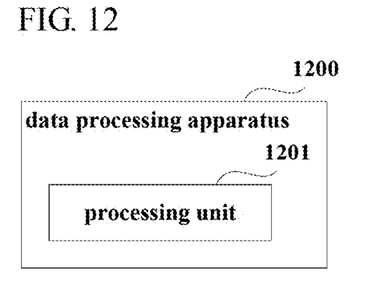
FIG. 12 is a schematic diagram of the data processing apparatus of Embodiment 10 of this disclosure.

FIG. 12 is a schematic diagram of the apparatus. Referring to FIG. 12, the apparatus 1200 includes:

a processing unit 1201 configured to add a header to the data packet, the header being located at a predetermined position in the data packet, such as a position other than a starting position, e.g. at the end, so as to deliver the data packet added with the header to a PDCP layer.

In this embodiment, a method for adding a header to the data packet by the processing unit 1201 is not limited.

In this embodiment, the processing unit 1201 performs the above processing in the above new protocol layer.

In this embodiment, as described above, the new protocol layer is responsible for processing functions related to the quality of service (QoS) framework, and is located on the PDCP layer.

In this embodiment, the apparatus 1200 may further include a receiving unit (not shown) configured to receive the above data packet. A source of the data packet is not limited in this embodiment. In this embodiment, the data packet is, for example, an IP packet from an upper layer.

In this embodiment, the apparatus 1200 may further include a transmitting unit (not shown) configured to deliver the data packet added with the header to a PDCP layer. A manner of delivery is not limited in this embodiment.

With this apparatus, the packet header of the new protocol layer is placed at the end of its packet, such that a header compression function of its lower layer PDCP to the network layer data is not affected.

According to a third aspect of this embodiment, there is provided a network equipment, including the apparatus described in the second aspect. A systematic structure of the network equipment may be identical to that shown in FIG. 8, and functions of its components may be as described above, and this embodiment is not limited thereto.

According to a fourth aspect of this embodiment, there is provided a UE, including the apparatus described in the second aspect. A systematic structure of the UE may be identical to that shown in FIG. 9, and functions of its components may be as described above, and this embodiment is not limited thereto.

According to a fifth aspect of this embodiment, there is provided a communication system, including the network equipment described in the third aspect and the UE described in the fourth aspect. A structure of the communication system may be identical to that shown in FIG. 1, and functions of its components may be as described above, and this embodiment is not limited thereto.

The above apparatuses and methods of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 5-7 may either correspond to software modules of procedures of a computer program, or correspond to hardware modules. Such software modules may respectively correspond to the steps shown in FIGS. 2-4. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. A data processing method, including:
adding a header to a first data packet to obtain a second data packet, the header being located at a predetermined position in the second data packet, so as to deliver the second data packet added with the header to a PDCP layer.

Supplement 2. The method according to supplement 1, wherein the header is located at a position other than a starting position in the second data packet.

Supplement 3. The method according to supplement 1, wherein the header is located at the end of the second data packet.

Supplement 4. The method according to supplement 1, wherein the data processing method is implemented in a protocol layer above the PDCP layer.

Supplement 5. The method according to supplement 4, wherein the protocol layer is responsible for processing functions related to QoS framework.

Supplement 6. A data processing apparatus, including:

a processing unit configured to add a header to a first data packet to obtain a second data packet, the header being located at a predetermined position in the second data packet, so as to deliver the second data packet added with the header to a PDCP layer.

Supplement 7. The apparatus according to supplement 6, wherein the header is located at a position other than a starting position in the second data packet.

Supplement 8. The apparatus according to supplement 6, wherein the header is located at the end of the second data packet.

Supplement 9. The apparatus according to supplement 6, wherein the processing unit performs the processing in a protocol layer above the PDCP layer.

Supplement 10. The apparatus according to supplement 9, wherein the protocol layer is responsible for processing functions related to QoS framework.

What is claimed is:

1. A user equipment (UE) comprising:
a memory configured to store a system information block(s);
a receiver configured to receive information on an area related identity (ID) corresponding to a system information block(s) mapping information field (SIB-Mappinginfo field), the area related ID corresponding to a number of a system information block(s); and
processor circuitry configured to:
control to check whether the stored system information block(s) is valid according to the information, and
configure the SIB-Mappinginfo field for the are related identity (ID) in a message broadcast by a network side,
wherein a bit included in the SIB-Mappinginfo field corresponds to a system information block, and the bit indicates that the system information block is associated with the area related ID.

2. The UE according to claim 1, wherein
the processor circuitry is further configured to:
use the stored system information block(s) when the stored system information block(s) is valid, and
acquire a new system information block(s) to which the area related ID corresponds when the stored system information block(s) is invalid.

3. The user equipment (UE) according to claim 1, further comprising:
a transmitter configured to transmit, to a network device, a system information request message corresponding to the area related ID.

4. The user equipment (UE) according to claim 3, further comprising:
the receiver configured to receive, from the network device, a new system information block(s) that is transmitted by the network device according to system information request message.

5. The UE according to claim 1, wherein
the area related ID corresponds to the number of a system information block(s) in all system information block(s).

6. A network device, comprising:
a memory;
processor circuitry coupled to the memory and is configured to:
transmit information on an area related identity (ID) corresponding to a system information block(s) mapping information field (SIB-Mappinginfo field), the area related ID corresponding to a number of a system information block(s),
cause a user equipment (UE) to check whether a system information block(s) to which the UE is stored is valid according to the information by transmitting the information, and
configure the SIF-Mappinginfo field for the area related identity (ID) in a broadcast message,
wherein a bit included in the SIB-Mappinginfo field corresponds to a system information block, and the bit indicates that the system information block is associated with the area related ID.

7. The network device according to claim 6, further comprising:
a receiver configured to receive a system information request message transmitted by the UE, the system information request message corresponding to the area related ID.

8. The network device according to claim 7, wherein
the processor circuitry is further configured to transmit, to the UE, a new system information block(s) device according to the system information request message.

9. A wireless communication system comprising:
a network device configured to:
transmit information on an area related identity (ID) corresponding to a system information block(s) mapping information field (SIB-Mappinginfo field), the area related ID corresponding to a number of a system information block(s), and
configured the SIB-Mappinginfo field for the area related identity (ID) in a broadcast message, wherein a bit included in the SIB-Mappinginfo field corresponds to a system information block, and the bit indicates that the system information block is associated with the area related ID; and
a receiver configured to:
receive the information from the network device, and
control to check whether the stored system information block(s) is valid according to the information.

* * * * *